Dec. 6, 1932.  W. MÜLLER-KEUTH  1,890,332
FLEXIBLE ELASTIC COUPLING
Filed Aug. 25, 1931
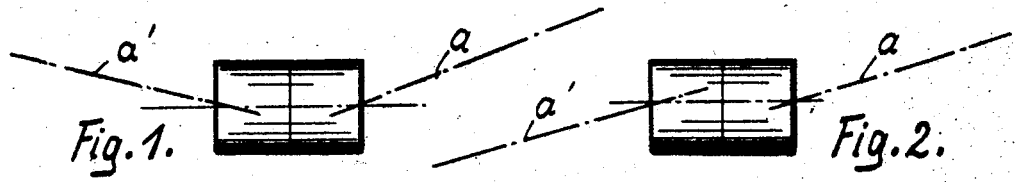
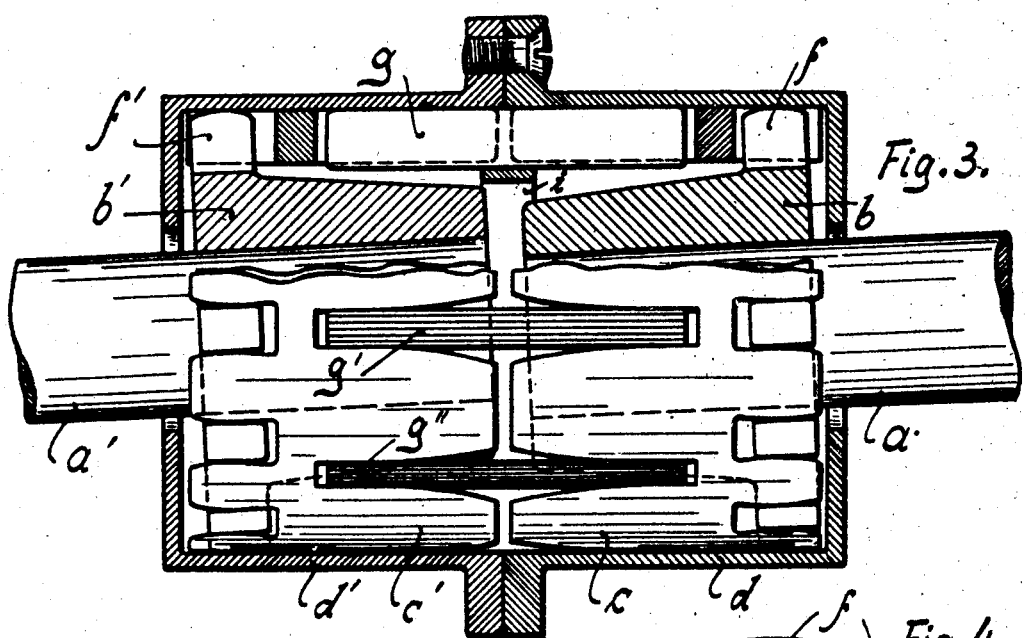
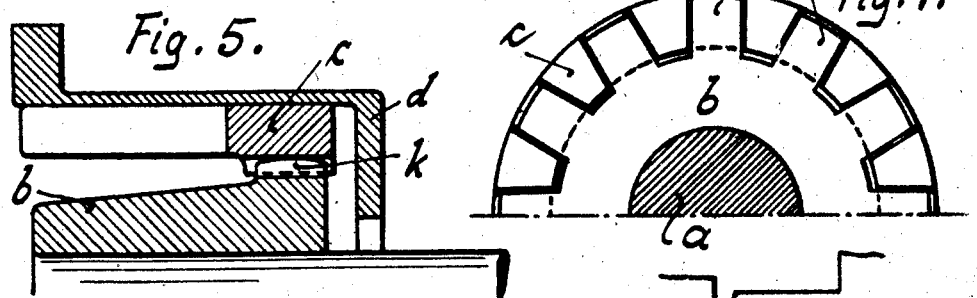
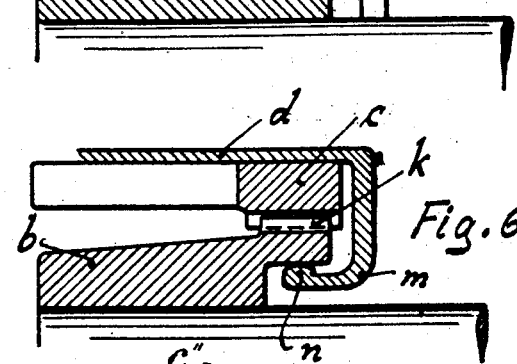
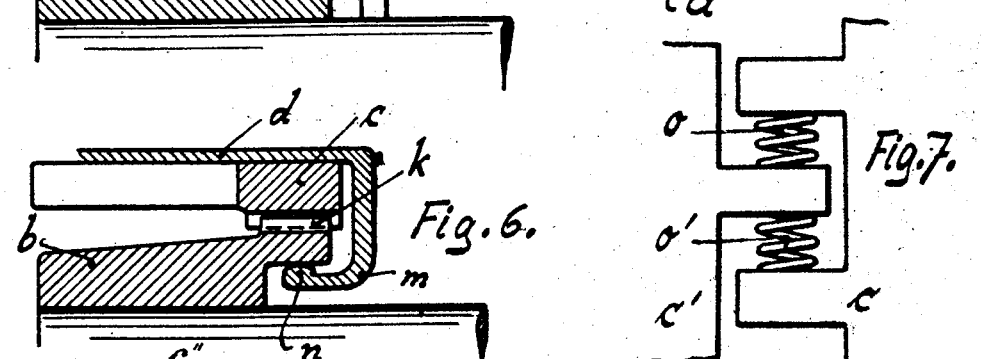
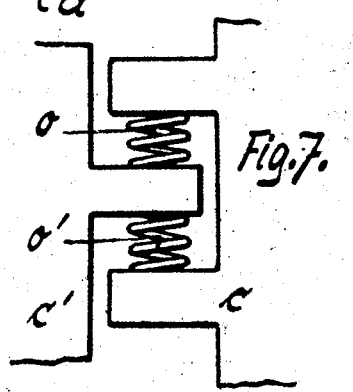
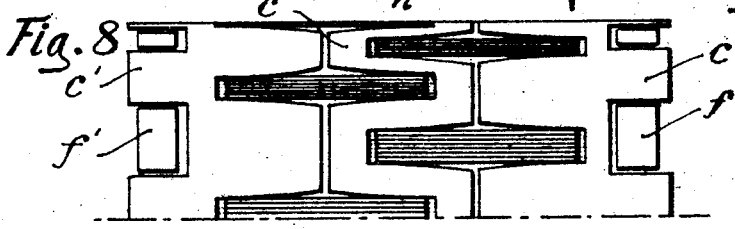

Patented Dec. 6, 1932

1,890,332

UNITED STATES PATENT OFFICE

WILHELM MÜLLER-KEUTH, OF HANOVER, GERMANY, ASSIGNOR TO FIRM EISENWERK WÜLFEL, OF HANOVER-WULFEL, GERMANY

FLEXIBLE ELASTIC COUPLING

Application filed August 25, 1931, Serial No. 559,234, and in Germany September 11, 1930.

This invention relates to improvements in flexible elastic couplings.

In a flexible elastic coupling the elastic members connecting the ends of both shafts are subjected to incalculable stresses during the rotation of the shafts as soon as the coaxiality of the latter ceases, because in this case the mutual position of the planes in which the elastic members are fastened to both shafts continuously changes during the rotation of the shafts.

It has already been proposed to journal the elastic members at one shaft only and to effect the transmission by a lost-motion device connected to the other shaft and cooperating with the springs. With this construction the relative position of the lost-motion device in regard to the spring is continuously changed that likewise unfavorably affects the stresses exerted upon the springs.

According to the present invention an auxiliary member consisting of two or more parts is inserted between the lost-motion devices, mounted at the ends of the shafts, and the elastic members, and the said parts are arranged, for instance, by means of a supporting member, such as a box or pivot, coaxially so that they may be turned towards one another and may be swung in all directions regarding the ends of both shafts.

In this way the elastic members are withdrawn from the influence of a displacement of the shafts and the incalculable stresses occurring in the well-known couplings, because the box or pivot takes over the effect of the displacements of the shaft, which effect is absorbed by the elastic members in the well-known coupling devices.

The invention is illustrated by way of example in the annexed drawing in which

Figs. 1 and 2 show the directions in which the ends of both shafts may be displaced in relation to each other.

Fig. 3 is a longitudinal cross-section of a coupling constructed according to the invention, the box which keeps the elastic members together being shown wholly in cross-section, and the auxiliary body in which the springs are mounted being shown partially in cross-section and partially in elevation.

Fig. 4 is one half of a front elevation of the end of a shaft, whilst

Figs. 5 to 8 show modifications of details of the coupling.

On the ends of the shafts $a$, $a'$ to be connected lost-motion devices $b$, $b'$ are wedged. $c$, $c'$ are two auxiliary members which are kept together by the box $d$, $d'$ consisting of two halves screwed together. $f$, $f'$ are teeth mounted on the lost-motion devices $b$, $b'$ and engaging a corresponding toothing of the members $c$, $c'$. $g$, $g'$, $g''$ are springs connecting with each other the auxiliary members $c$, $c'$. $i$ is a ring forcing the springs $g$ against the box $d$, $d'$.

In the modification shown in Figs. 5 and 6 the inner face of the annular member $c$ is provided with a toothing $k$ engaging a corresponding toothing of the lost-motion device $b$. In Fig. 7 the flat springs $g$ are replaced by helical springs $o$, $o'$.

In Fig. 3 the two shafts are shown displaced in accordance with the possibility shown in Fig. 2. This displacement has acted on the coupling in such a way that the toothings $f$, $f'$ and those in the members $c$, $c'$ have been displaced in relation to each other, whereas the auxiliary member $c$, $c'$ and the springs $g$ have retained the same position they had when the shafts $a$, $a'$ were $c$ axial.

The outer faces of the teeth $f$, $f$ are ball-shaped to render possible or to facilitate the cooperation of the lost-motion devices $b$, $b'$ with the auxiliary members $c$, $c'$. The ring $i$ may be replaced by a sheet metal disk or a helically wound wire.

In Fig. 6 the play of the box $d$ and the auxiliary members $c$, $c'$ in relation to the shafts $a$, $a'$ or the lost-motion device $b$, $b'$ is warranted by arranging a globular ring surface $n$ at the front flange of the box $d$. The annular surface $n$ is located approximately in the middle plane of the toothing $k$ in a recess of the lost-motion device $b$. Now, as the toothing is no more the supporting element of the casing, it may be formed to have normal addendum and root circles. The flat or helical springs $g$ or $o$ may be replaced by other elastic members, such as rubber blocks or the like. To increase the yieldingness of the coupling several annular sockets $c, c' c''$ may be connected in series by the way of spring members as shown in Fig. 8.

The invention may further be applied to continuous shafts in combination with hollow shafts; the hollow shaft may form the hub body of a wheel or another rotating machine element.

I claim:—

1. A flexible elastic shaft coupling, comprising lost-motion devices fastened on the ends of the two shafts to be coupled, elastic members located between the said lost-motion devices, and auxiliary members connecting the said lost-motion devices with the said elastic members and arranged coaxial and rotatable in relation to each other and capable of being swung in all directions in relation to the ends of both shafts.

2. A flexible elastic shaft coupling, comprising lost-motion devices fastened on the ends of the two shafts to be coupled, toothings on the said lost-motion devices, auxiliary members provided with toothings to engage the first-named toothings, and elastic members connecting the said auxiliary members.

3. A flexible elastic shaft coupling, comprising lost-motion devices fastened on the ends of the two shafts to be coupled, toothings on the said lost-motion devices, having ball-shaped outer surfaces, auxiliary members provided with toothings to engage the first-named toothings, and elastic members connecting the said auxiliary members.

4. A flexible elastic shaft coupling, comprising lost-motion devices fastened on the ends of the two shafts to be coupled, elastic members located between the said lost-motion devices, auxiliary members connecting the said lost-motion devices with the said elastic members and arranged coaxial and rotatable in relation to each other and capable of being swung in all directions in relation to the ends of both shafts, and a casing enclosing the whole of the coupling devices.

5. A flexible elastic shaft coupling, comprising lost-motion devices fastened on the ends of the two shafts to be coupled, toothings on the said lost-motion devices, auxiliary members provided with toothings to engage the first-named toothings, elastic members connecting the said auxiliary members, a casing enclosing the whole of the coupling devices, and recesses in the front faces of the lost-motion devices adjacent the shafts, the front walls of the said casing being bent to enter the said recesses and engaging their cylindrical walls with a globular annular face in the middle plane of the toothings.

In testimony whereof I affix my signature.

WILHELM MÜLLER-KEUTH.